3,433,710
PROCESS FOR THE PREPARATION OF 7-CHLORO-5-HYDROXYTETRACYCLINE
Jerry Robert Daniel McCormick, Spring Valley, Sylvia Jennie Johnson, Pearl River, N.Y., and Newell Oscar Sjolander, Saddle River, N.J., assignors to American Cyanamid Company, Stamford, Conn., a corporation of Maine
No Drawing. Filed Jan. 7, 1966, Ser. No. 519,302
U.S. Cl. 195—80                        6 Claims
Int. Cl. C12d 9/18, 9/00

ABSTRACT OF THE DISCLOSURE

This disclosure describes a process for biologically transforming 7-chloro-5a,11a-dehydrotetracycline to 7-chloro-5-α-hydroxytetracycline with a strain of a 5-hydroxytetracycline-producing species of the genus Streptomyces such as *S. rimosus*, *S. platensis* and *S. hygroscopicus*.

---

This invention relates to a new process for producing 7-chloro-5-α-hydroxytetracycline and, more particularly, is concerned with a novel process for biologically transforming 7-chloro-5a,11a-dehydrotetracycline to 7-chloro-5-α-hydroxytetracycline.

Our invention is based upon the discovery that it is possible to effect the biological transformation of 7-chloro-5a,11a-dehydrotetracycline (sometimes known in terms of its tautomer, 7-chloro-5,5a-dehydrotetracycline) to 7-chloro-5-α-hydroxytetracycline. The method of the present invention, in its broader aspects, comprises the biological reduction of the 5a,11a-double bond accompanied by the biological hydroxylation at the 5-α-position of the 7-chloro-5a,11a-dehydrotetracycline. This transformation is accomplished by adding 7-chloro-5a,11a-dehydrotetracycline to a fermentation medium inoculated with a strain of a 5-hydroxytetracycline-producing species of the genus Streptomyces such as *S. rimosus*, *S. platensis* or *S. hygroscopicus*. Typical strains that are operative in the novel process of the present invention are the following:

| | |
|---|---|
| *S. rimosus* | ATCC 13224 |
| *S. rimosus* | NRRL 2234 |
| *S. rimosus* | NRRL 3098 |
| *S. hygroscopicus* | NRRL 3015 |
| *S. platensis* | NRRL 2364 |

It is most surprising that the 7-chloro-5a,11a-dehydrotetracycline can serve as a substrate which can be acted upon by the microorganism so as to transform the 7-chloro-5a,11a-dehydrotetracycline to 7-chloro-5-α-hydroxytetracycline. In the normal fermentation, the ingredients of the nutrient medium serve as the substrate from which the antibiotic is synthesized. It is unexpected to discover that a chemical compound as structurally stable as 7-chloro-5a,11a-dehydrotetracycline may serve as the substrate for producing 7-chloro-5-α-hydroxytetracycline.

The conditions of the fermentation for the biological conversion of 7-chloro-5a,11a-dehydrotetracycline to 7-chloro-5-α-hydroxytetracycline are generally the same as set forth in U.S. Patent 2,482,055 to Duggar, U.S. Patent 2,734,018 to Minieri et al. and U.S. Patent 2,878,289 to McCormick et al. and which, in turn, are generally the same as for the presently known methods for producing various tetracyclines by fermentation. That is, the fermentation medium contains the usual nutrients and mineral substances. Suitable nutrients include any assimilable sources of carbon such as the polysaccharides or starches, or polyalcohols such as glycerol may be used. An assimilable source of nitrogen may be supplied through the use of proteins, protein hydrolysates, urea, corn steep liquor, meat extracts, peptone, distillers solubles, fish meal and other conventional substances. The common anions and cations are supplied in the form of their non-toxic salts. Trace elements such as manganese, cobalt, zinc, copper, etc. are obtained either as impurities in the above compounds, or through the use of tap water or by specifically adding solutions especially enriched with these trace elements.

The other general conditions of the fermentation such as hydrogen ion concentration, temperature, time, rate of aeration, preparation of the inoculum, sterilization, inoculation and the like are conventional and are similar to those for the production of other tetracyclines as set forth in the aforementioned U.S. patents to Duggar, Minieri et al. and McCormick et al.

The fermentation is allowed to proceed under normal conditions for 24 to 60 hours which is the time normally required to obtain good growth of the Streptomyces culture. The 7-chloro-5a,11a-dehydrotetracycline starting material is then added to the fermentation at any desired concentration, although for practical reasons the 7-chloro-5a,11a-dehydrotetracycline substrate at a concentration of up to about 10 grams per liter of medium is satisfactory although higher concentrations may be used with some sacrifice in yield. The addition of the 7-chloro-5a,11a-dehydrotetracycline starting material may be accomplished in any suitable manner so long as it promotes contact of the 7-chloro-5a,11a-dehydrotetracycline with the biological medium. To this end, it is preferred to add the 7-chloro-5a,11a-dehydrotetracycline starting material in a solvent such as water, dimethylformamide, dimethylacetamide, dimethylsulfoxide and tetramethylenesulfoxide. However, a solution of the 7-chloro-5a,11a-dehydrotetracycline in water or dimethylsulfoxide is most preferred for the 7-chloro-5a,11a-dehydrotetracycline starting material. After the fermentation has been continued for a suitable time, for example, from 96 to 120 hours, and the transformation of the 7-chloro-5a,11a-dehydrotetracycline to the desired 7-chloro-5-α-hydroxytetracycline is substantially complete, the 7-chloro-5-α-hydroxytetracycline product may be separated from the fermentation mash in any convenient manner. The isolation process may be selected from any of the numerous isolation techniques now well known in the art. The starting material for the novel process of the present invention, 7-chloro-5a,11a-dehydrotetracycline, may be prepared as described in U.S. Patent 3,007,965 to Growich et al.

The invention will be described in greater detail in conjunction with the following specific examples.

Example 1

Spores of *Streptomyces rimosus* strain ATCC 13224 were washed from an agar slant with sterile distilled water to form a spore suspension. A 0.33 ml. portion of this suspension was used to inoculate an 8 inch test tube containing 8 ml. of a medium prepared according to the following formulation:

| | Grams |
|---|---|
| Sucrose | 30 |
| Ammonium sulfate | 2 |
| Calcium carbonate | 7 |
| Cornsteep liquor | 20 |
| Tap water, q.s. 1000 milliliters. | |

Prior to inoculation, this medium was sterilized by autoclaving for 20 minutes under a pressure of 15 pounds per square inch. The inoculated tube was incubated for 24 hours, at 28° C. on a reciprocating shaker operating at 116 oscillations per minute, whereby an inoculum of the *S. rimosus* was obtained.

A fermentation medium of the following composition was prepared:

| | | |
|---|---|---|
| Corn flour | grams | 14.5 |
| Corn steep | milliliters | 25.0 |
| Calcium carbonate | do | 9.0 |
| Ammonium sulfate | do | 6.72 |
| Ammonium chloride | do | 2.0 |
| Manganese sulfate | do | 0.10 |
| Cobaltous chloride | do | 0.005 |
| Corn starch | do | 52.5 |

Water, q.s. 1000 milliliters.

This medium was dispensed into 250 ml. Erlenmeyer flasks at the rate of 25 ml. per flask. A sufficient quantity of lard oil was added to each flask to provide a concentration of 2.5% v./v. The flasks were then placed in an autoclave for 20 minutes at a pressure of 15 pounds per square inch to sterilize the media. Each flask was then inoculated with 1.0 ml. of the S. rimosus inoculum. The fermentation was carried out for 29 hours at 28° C. on a rotary shaker operating at 180 r.p.m. At this time an 11.05 mg. portion of 7-chloro-5a,11a-dehydrotetracycline was added to the 250 ml. Erlenmeyer flask containing the 25 ml. of partially fermented medium. The fermentation was continued for an additional 91 hours at 28° C. on the rotary shaker. At this time a microbiological assay of the mash revealed 28.5 mcg./ml. of activity calculated in terms of 7-chlorotetracycline. Another mash portion fermented at the same time and under the same conditions, but with no 7-chloro-5a,11a-dehydrotetracycline added, assayed 5.3 mcg./ml. in terms of 1-chlorotetracycline.

Example 2

The procedure of Example 1 was followed with these exceptions: At the end of 29 hours of the fermentation cycle an 11.8 mg. portion of 7-chloro-5a,11a-dehydrotetracycline was added to the 250 ml. Erlenmeyer flask containing the 25 ml. of partially fermented medium. The fermentation was continued for an additional 91 hours at 28° C. on the rotary shaker. At this time a microbiological assay of the mash revealed 34.5 mcg./ml. of activity calculated in terms of 7-chlorotetracycline. A control mash run in exactly the same manner but without the addition of 7-chloro-5a,11a-dehydrotetracycline assayed 1.3 mcg./ml. in terms of 7-chlorotetracycline.

Example 3

The procedure of Example 1 was followed with these exceptions: At the end of 30 hours of the fermentation cycle a 10.85 mg. portion of 7-chloro-5a,11a-dehydrotetracycline, in a mixture of 10 mg. of magnesium acetate and 0.6 ml. of dimethylsulfoxide, was added to a 250 ml. Erlenmeyer flask containing 25 ml. of the partially fermented medium. The fermentation was continued for an additional 90 hours at 28° C. on the rotary shaker. At this time a microbiological assay of the mash revealed 25.1 mcg./ml. of activity calculated in terms of 7-chlorotetracycline. A control mash run in exactly the same manner but with 10.55 mg. of 7-chloro-5a,11a-dehydrotetracycline added at harvest (120 hours) assayed 3.5 mcg./ml. in terms of 7-chlorotetracycline. A control mash run in exactly the same manner but without the addition of 7-chloro-5a,11a-dehydrotetracycline assayed 0.9 mcg./ml. in terms of 7-chlorotetracycline.

Example 4

An inoculum medium was prepared as described in Example 1 and inoculated with pores of S. rimosus strain ATCC No. 13224. A 40 liter fermentation medium of the following composition was prepared:

| | | |
|---|---|---|
| Calcium carbonate | grams | 360 |
| Corn steep | do | 720 |
| Corn starch | do | 2100 |
| Corn flour | do | 580 |
| Manganese sulfate | do | 4 |
| Cobaltous chloride | do | 0.20 |
| Ammonium chloride | do | 80 |
| Ammonium sulfate | do | 268 |
| Lard oil | percent v./v | 2.5 |

Water, q.s. 40,000 milliliters.

This medium was inoculated with a 2 liter portion of the S. rimosus inoculum. The fermentation was carried out for 43 hours at 28° C. At this time 16 grams of 7-chloro-5a,11a-dehydrotetracycline was added and the fermentation was continued for an additional 77 hours at 28° C.

Samples of mash were taken at intervals and assayed microbiologically. The results appear in Table I below:

| Time from start of fermentation, hours: | mcg./ml. of activity caluclated in terms of 7-chlorotetracycline |
|---|---|
| 48 | 17.9 |
| 72 | 27.3 |
| 96 | 45.8 |
| 119 | 36.9 |

Example 5

A 40 ml. portion of harvest mash, prepared as described in Example 1 (microbiological assay 35 mcg./ml. in terms of 7-chlorotetracycline), was adjusted to pH 1.5 with hydrochloric acid. A portion of filter-aid was added and the mixture was filtered. The filtrate was extracted with p-chlorophenol. The p-chlorophenol extract was streaked across the top of four chromatographic paper strips. The strips were dried, placed in a chromatographic jar and allowed to equilibrate overnight. The following day they were developed for 7½ hours. The system used was isobutanol: isobutyl acetate: 0.1 M solution of the disodium salt of ethylenediaminetetraacetic acid (20:20:10) at pH 7.7. The strips exhibited a yellow band at $R_f$ 0.54. The fluorescence of this band when viewed in ultraviolet light intensified when sprayed with ammonia (ammonia positive). The bands of $R_f$ 0.54 on the four strips were eluted using 35 ml. of methanol and 15 ml. of 0.1 N HCl on a shaker for ½ hour. The eluate was filtered and evaporated to 5 ml. A portion of the 5 ml. of eluate assayed microbiologically 6.7 mcg./ml. calculated in terms of tetracycline and spectrophotometrically 47 mcg./ml. calculated in terms of tertacycline. A portion of the 5 ml. of eluate was rechromatographed in the same system. The results of this chromatogram and those of controls run in the same system are as follows:

| | |
|---|---|
| Elutate (7-chloro-5-α-hydroxytetracycline) | $R_f$ 0.62 |
| 7-chlorotetracycline | $R_f$ 0.49 |
| 7-chloro-5a,11a-dehydrotetracycline | $R_f$ 0.16 |
| 2-carboxamido-2-acetyl-5-hydroxytetracycline | $R_f$ 0.30 |
| 4 - epi - 2 - decarboxamido - 2 - acetyl - 5 - hydroxytetracycline | $R_f$ 0.08 |
| 4-epi-7-chlorotetracycline | $R_f$ 0.22 |

A portion of the 5 ml. of eluate was rechromatographed in the system butanol: 0.3 M sodium dihydrogenphosphate at pH 3.0. The results of this chromatogram and those of controls run in the same system are as follows:

| | |
|---|---|
| Eluate (7-chloro-5-α-hydroxytetracycline) | $R_f$ 0.68 |
| 7-chloro-5a,11a-dehydrotetracycline | $R_f$ 0.55 |
| Tetracycline | $R_f$ 0.37 |
| 7-chlorotetracycline | $R_f$ 0.58 |
| 5-hydroxytetracycline | $R_f$ 0.36 |
| 2 - decarboxamido - 2 - acetyl - 5 - hydroxytetracycline | $R_f$ 0.63 |

What is claimed is:
1. A process for the biological conversion of 7-chloro-5a,11a-dehydrotetracycline to 7-chloro-5-α-hydroxytetracycline which comprises adding 7-chloro-5a,11a-dehydrotetracycline to an aqueous nutrient medium containing assimilable sources of carbon, nitrogen and inorganic salts, and fermenting the aqueous nutrient medium under submerged aerobic conditions with a strain of a 5-hydroxy- tetracycline-producing species of the genus *Streptomyces* selected from the group consisting of *S. rimosus, S. platensis* and *S. hygroscopicus*, continuing the fermentation until the 7-chloro-5a,11a-dehydrotetracycline is substantially converted to 7-chloro-5-α-hydroxytetracycline, and recovering the 7-chloro-5-α-hydroxytetracycline so produced.

2. A process according to claim 1 wherein the strain of Streptomyces employed is *S. rimosus* ATCC 13224.

3. A process according to claim 1 wherein the strain of Streptomyces employed is *S. rimosus* NRRL 2234.

4. A process according to claim 1 wherein the strain of Streptomyces employed is *S. rimosus* NRRL 3098.

5. A process according to claim 1 wherein the strain of Streptomyces employed is *S. hygroscopicus* NRRL 3015.

6. A process according to claim 1 wherein the strain of Streptomyces employed is *S. platensis* NRRL 2364.

References Cited

McCormick et al.: Journal of The American Chemical Society, vol. 84, Aug. 5, 1962, pp. 3023–3025.

Von Wittenaw et al.: Journal of Organic Chemistry, vol. 28, pp. 2454–2456, September 1963.

Miller et al.: Biochemical and Biophysical Research Communications, vol. 18, No. 3, 1965, pp. 325–331.

MAURICE W. GREENSTEIN, *Primary Examiner.*

U.S. Cl. X.R.

260—559